Aug. 28, 1928.

S. MÖHL 1,682,303

HYDRAULIC CHANGE SPEED GEARING

Filed March 31, 1922

INVENTOR:
Steffen Möhl
By Francis E. Boyce
Attorney

Patented Aug. 28, 1928.

1,682,303

UNITED STATES PATENT OFFICE.

STEFFEN MÖHL, OF COPENHAGEN, DENMARK.

HYDRAULIC CHANGE-SPEED GEARING.

Application filed March 31, 1922, Serial No. 548,553, and in Denmark April 9, 1921.

The present invention relates to a hydraulic change-speed and reversing gearing device with pump and motor of variable productivity both constructed according to the gear-pump system of the type described in Patent No. 1,603,395 granted to me under date of October 19, 1926. The distinguishing feature of the invention is that said pump and motor each comprises a pair of intermeshing gears, one of said gears forming an internally toothed drum disposed in concentric relation to the shaft and the other an externally toothed gear journalled about an eccentric disc, one of said eccentric discs being fixed on the driven shaft, while the other eccentric disc is mounted for limited rotative movement about this shaft. Between the pump and motor, and similarly mounted for limited rotative movement about the driven shaft, is disposed a member in tight-fitting engagement with both, said member being provided with a communicating channel, the organization being such that when said disc is rotated about the shaft the meshing fields of the two pairs of gears are displaced relatively to the position of the connecting channel whereby the ratio of gearing may be changed or the direction of rotation reversed.

Another distinguishing feature of the invention is that one of the internally toothed drums is rigidly conected to the gear casing, in such a manner that the casing itself will be rotatable.

In the drawings accompanying and forming part of this specification,

Fig. 5 a detail.

Figure 2:
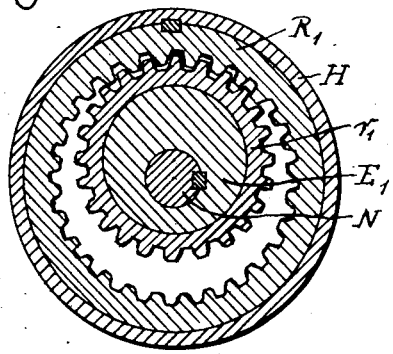
Figs. 2, 3 and 4 are cross-sections taken respectively along the lines II—II, III—III and IV—IV of Fig. 1.
Figure 3:
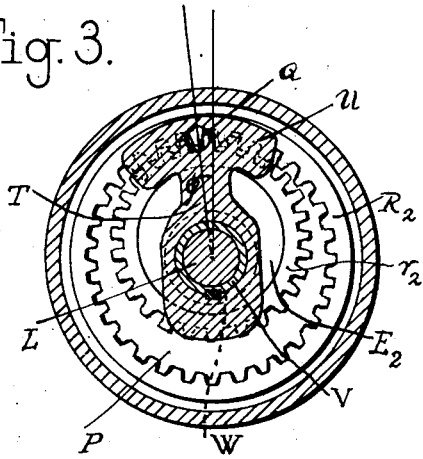
Figure 4:
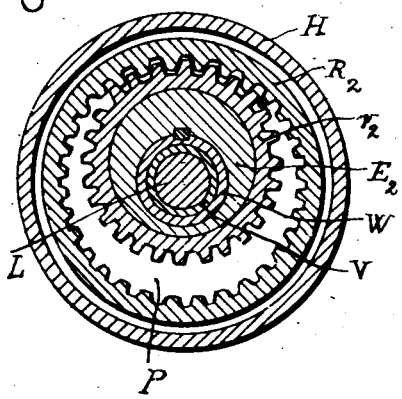

In the construction shown, M indicates the driving and L the driven shaft, said shafts being disposed in axial alinement. The gear box G H J is rigidly connected to the driving shaft M, and forms bearings for the driven shaft L. In order to support the entire gearing device, the gear box should preferably be journalled in fixed bearings, such, for instance, as ball-bearings K, as shown in the drawing. Inside of the gear box, which is supposed to be filled with oil or other fluid, there is mounted at one end and close to the end wall G, an internally toothed drum $R_1$, said drum being keyed to the drum H as shown clearly in Fig. 2. An externally toother drum $r_1$, journalled about an eccentric $E_1$ fixed on the driven shaft and resting against the end wall G of the gear box, is in engagement at one portion of its periphery with the drum $R_1$.

A similar set of toothed drums $R_2$ and $r_2$ is provided at the opposite end of the gear box. The drum $R_2$, however, is not rigidly connected to the gear box, but is made integral with a circular disc P, which is provided with a tubular extension or sleeve N which encircles the driven shaft L and passes through the head J of the gear box, said sleeve carrying outside of the gear box, a brake disc $a$ adapted to be acted upon by a brake band $b$. The eccentric $E_2$, about which the drum $r_2$ is journalled, is not attached to the driven shaft L proper, but to a tubular shaft W encircling the driven shaft, said tubular shaft being itself encircled by the sleeve N. The tubular shaft W, as hereinafter described, is adapted to be given a slight rotation about the shaft L, but normally partakes fully and entirely in the rotation of the latter. The two eccentrics $E_1$ and $E_2$ are so disposed that the two sets of toothed drums $R_1$ $r_1$ and $R_2$ $r_2$ have their meshing fields located exactly or approximately opposite one another. Mounted on the shaft L within the tubular shaft W is a tubular shaft V, which extends within the gear box to a point adjacent to the disc $E_1$ and has secured thereto an arm T carrying an obturating plate U which fits tightly between the two sets of drums $R_1$ $r_1$ and $R_2$ $r_2$ and is provided with a channel Q adapted to communicate with the meshing fields of the two sets of drums $R_1$ $r_1$ and $R_2$ $r_2$. The tubular shafts V and W are adapted to be rotated slightly relatively to the shaft L, but normally rotate together with said shaft.

With the meshing fields thus closed on the sides, when the shaft M is driven from some suitable source of power, the set of toothed drums $R_1$ $r_1$ forms a regular gear pump pumping oil through the channel Q into closed toothed-spaces of the set of toothed drums $R_2$ $r_2$, which are thereby forced to rotate and, thus, to act as a motor.

Supposing that the driven shaft L is under load, it will be seen that if the braking disc $a$ is released entirely, then the only effect of the rotation of the driving shaft M will be that the braking shaft or sleeve N with the braking disc $a$ will commence to rotate (running empty), the motor having then only to overcome the friction of the sleeve N. If, on the other hand, the brake disc $a$ is braked tightly, so that the resistance against rotation of the sleeve N is considerable, the motor action will manifest itself in that the eccentric $E_2$ with the tubular shaft W and, thereby, also the shaft L (the driven shaft) will be rotated, and this rotation will then also be partaken by the eccentric $E_1$, which is fixed on the shaft L and by the tubular shaft V with the obturating plate U, in such a manner that the fields of engagement and the connecting channel Q between the latter will constantly remain in the same relative position.

During these conditions the oil pressure alone in the pump will cause rotation of the shaft L, the said pressure causing the eccentric disc $E_1$ to yield in the direction of rotation of the toothed drum $R_1$.

As will be understood from the above explanation, the brake disc $a$ in connection with the brake band $b$ will form a clutch for coupling and uncoupling the driving motor, corresponding to what is known in other gear constructions.

The pressure exerted by the oil in the pump and motor will exert itself on the circular disc P in axial direction. In order to take up this pressure and prevent any excessive friction between the said disc P and the end J of the gear box a thrust bearing may suitably be inserted therebetween in the shape of a ball bearing F.

In order that the pump and motor may operate effectively, it is necessary that the communicating channel Q, by way of which the oil is to be transferred from one to the other, should not be in alinement with the center of the meshing fields, where the depth of meshing would be practically constant during the passage of the teeth past the channel orifice, so that no oil at all would be passed through the channel. However, when the channel Q is displaced somewhat to the side of the said center, out of meshing field of the pump, the depth of meshing will increase during such passage of the teeth and consequently a certain quantity of oil be forced out from each tooth space into the channel Q. The farther the channel is off center with relation to the meshing field of drums $R_1$ $r_1$ (although it must always be within the limits of the meshing field), the larger will be the quantity of oil which the pump, for each passage of a tooth across the channel orifice, will drive into the channel. On the other hand, the quantity of oil which the pump drives through the channel Q will be received the easier by the motor the nearer the channel Q is located to the outer limit of the meshing field of the drums $R_2$ $r_2$; and consequently the slower will be the speed of rotation of the motor. At "start" the channel Q will be opposite the center of the meshing field of the pump and, at the same time, far to the side of the center of the meshing field of the motor. The pump will then drive no oil at all into the motor, which consequently will remain motionless (gear ratio zero), but merely will remain ready to receive larger quantities of oil. For "starting", after the gearing device has been coupled in, the position of the channel Q relatively to the center of the two meshing fields must be altered in such a manner that the channel is removed slightly from the center of the fields of engagement on the pump side while on the motor side it is moved slightly nearer towards the center of the meshing field. The pump then forces a small quantity of oil through the channel Q, and such oil is relatively easily discharged by way of the motor, which is thereby rotated, but only relatively slowly ("low gear"). The more the channel is removed from the center of the meshing field of the pump, and simultaneously carried nearer to the center of the meshing field of the motor, the larger will be the quantity of oil that is conveyed, and the faster will the motor be driven (higher gear), until the point is reached where the channel stands opposite the center of the meshing field of the motor and, simultaneously, quite far away from the centre of the meshing field of the pump. The motor will then be unable to receive any oil notwithstanding the attempts of the pump to drive oil by way of the channel Q. The toothed drums $r_1$ and $r_2$ will therefore not rotate relatively to drums $R_1$ and $R_2$ respectively, and consequently the driving and the driven shaft will rotate at one and the same speed (gear ratio equal). The pump and motor will then be coupled together by a fluid-lock. If the increase of gear ratio is continued by moving the channel Q beyond the center of the meshing field of the motor and, at the same time, still nearer to the outer limit of the pump meshing field, then, theoretically at least, "overgearing" will occur, and the driven shaft will rotate at even higher speed than the driving shaft proper.

If from "start" the channel Q is shifted to the opposite side of the center of the meshing field of the pump, the pump will begin to act as a suction pump instead of a compression pump, and instead of oil being forced from the pump into the motor, it will then be sucked in the opposite direction through the motor; in other words, the gearing device is now adjusted for back-gear.

Figure 1:
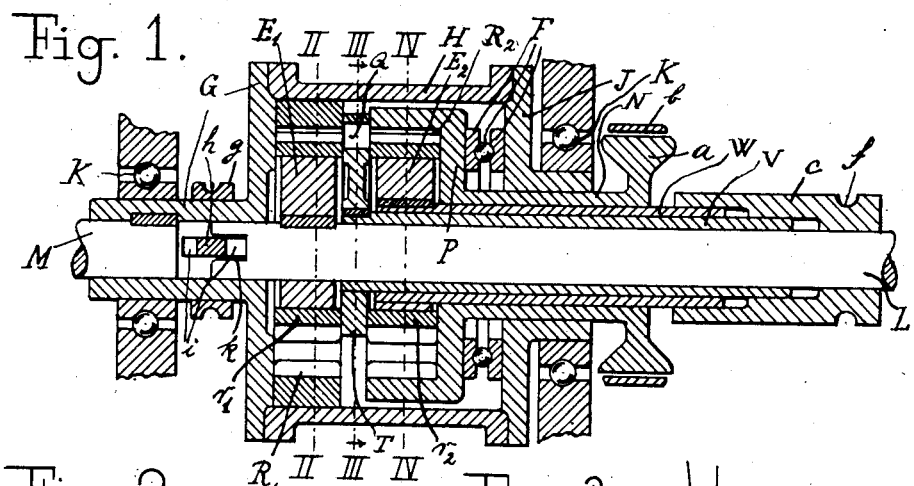
Fig. 1 is a longitudinal section showing by way of example a hydraulic change-speed and reversing gearing device embodying the present invention.
Figure 5:
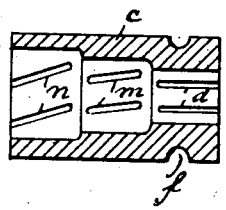

The above mentioned motion of the channel Q relatively to the center of the meshing fields of the pump and the motor is equivalent to a rotation of the tubular shafts V (with arm T) and W (with eccentric disc $E_2$) about the driven shaft L, and is effected by means of the following mechanism (Figs. 1 and 5).

On the driven shaft L and longitudinally movable thereon is mounted a stepped sleeve $c$ provided on its inner surface with three sets of guiding strips $d$, $m$ and $n$, the strips $d$ being parallel with the sleeve, while the strips $m$ and $n$ are helical. The strips $d$ are adapted to slide in grooves in the surface of the shaft L, the strips $m$ in grooves in the surface of the tubular shaft V, and the strips $n$ in grooves on the surface of the tubular shaft W. The strips $d$ are parallel to the axis of the shaft L, while the strips $m$ form a central small angle and the strips $n$ a slightly larger angle with said axis. From this construction it will readily be seen that when the sleeve $c$ is displaced on the shaft L toward the left of Fig. 1, the tubular shafts V and W will be slightly rotated relatively to the shaft L, and because of the difference between the helical pitch of the strips $m$ and that of the strips $n$, the tubular shaft W which carries the eccentric disc $E_2$ will be rotated a greater distance than the tubular shaft V, which carries the member U, thus changing the position of the channel Q with relation to the meshing fields of the drums $R_1$ $r_1$ and $R_2$ $r_2$. The displacement of the sleeve $c$ along the shaft L may be performed by means of a forked lever, not shown in the drawing, engaging an annular groove $f$ on the sleeve $c$. When adjustment is made for equal gear ratio and at the same time the coupling $a$ $b$ is released, a rigid coupling between the driving and the driven shaft may be provided. A coupling device of this nature in the shape of a clutch coupling is shown in the drawing. The hub-portion G of the gear box fixed to the driving shaft M carries a coupling ring $g$ adapted to be shifted by means of a forked lever not shown, the said coupling ring being provided with a diametrically disposed transverse bar $h$ for which the walls of the hub-portion are provided with corresponding slots $i$. The end of the driven shaft L is journalled in the hub-portion G, and is provided with a kerf $k$ adapted to receive the transverse bar $h$ of the coupling ring. When the coupling ring is shifted towards the gear box, the bar $h$ will enter into the kerf $k$, and the driving and driven shafts M and L will then be coupled together directly, in such a manner that any relative motion of the parts in the gear box will be precluded. The direct coupling is released when the coupling ring is shifted away from the gear box so as to withdraw the bar $h$ entirely from the kerf $k$.

Having now particularly described and ascertained the nature of my said invention and in what manner the same is to be performed, I declare that what I claim is:—

1. Hydraulic gearing device, comprising a driving shaft, a gear case mounted for rotation with said driving shaft, a driven shaft, a rotary pump, a rotary motor driven by said pump, said pump and motor being each of the gear wheel type for variable productivity and each having an outer and an inner member, a member disposed between said pump and motor and adapted to transfer pressure fluid from the rotary pump to the rotary motor, and means for altering the position of one of the members of the rotary pump relatively to the said transferring member, and the position of the latter relatively to one of the members of the rotary motor.

2. Hydraulic gearing device, comprising a driving shaft, a gear case mounted for rotation with said driving shaft, a driven shaft, an eccentric disc carried by said driven shaft, a rotary pump of the gear wheel type having an outer member firmly connected to the gear case and an inner member journalled on said eccentric disc, a tubular shaft disposed in concentric relation with said driven shaft, an eccentric disc carried by said tubular shaft, a rotary motor of the gear wheel type having an outer member normally held stationary and an inner member journalled on said last eccentric disc, a second tubular shaft disposed in concentric relation to said driven shaft, a member secured to said last tubular shaft and disposed between said pump and motor and adapted to transfer pressure fluid from the pump to the motor, and means for altering the position of the inner member of the motor relatively to the transferring member and the position of the latter relatively to the inner member of the pump.

3. Hydraulic gearing device, comprising a driving shaft, a gear case mounted for rotation with said driving shaft, a driven shaft, an eccentric disc carried by said driven shaft, a rotary pump of the gear wheel type having an outer member firmly connected to the gear case and an inner member journalled on said eccentric disc, a tubular shaft disposed in concentric relation with said driven shaft, an eccentric disc carried by said tubular shaft, a rotary motor of the gear wheel type having an outer member normally held stationary and an inner member journalled on said last eccentric disc, a second tubular shaft disposed in concentric relation to said driven shaft, a member secured to said last tubular shaft and disposed between said pump and motor and adapted to transfer pressure fluid from the pump to the motor, means for altering the position of the inner member of the motor relatively to the transferring member and the position of the latter relatively to the inner member of the pump, a mechanical coupling disposed between the gear case and the driven shaft and adapted to couple the said shaft to the gear case, the outer member of the motor being firmly connected to a band brake disposed outside of the gear case and adapted to hold the said member stationary during the operation of the gearing device.

In testimony whereof I have signed my name to this specification.

STEFFEN MÖHL.